United States Patent
Chowdhary et al.

(10) Patent No.: US 10,241,875 B2
(45) Date of Patent: Mar. 26, 2019

(54) SWITCHING INITIAL PROGRAM LOAD RESPONSIBILITY WHEN COMPONENTS FAIL

(71) Applicant: International Business Machines Corporation, Armonk, NY (US)

(72) Inventors: Manish K. Chowdhary, Bangalore (IN); Raja Das, Bangalore (IN); Nagendra K. Gurram, Bangalore (IN); Deepak Kodihalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 15/266,102

(22) Filed: Sep. 15, 2016

(65) Prior Publication Data

US 2018/0074921 A1    Mar. 15, 2018

(51) Int. Cl.
| | | |
|---|---|---|
| *G06F 11/00* | (2006.01) | |
| *G06F 11/20* | (2006.01) | |
| *G06F 11/14* | (2006.01) | |
| *G06F 11/07* | (2006.01) | |
| *G06F 11/22* | (2006.01) | |

(52) U.S. Cl.
CPC ........ *G06F 11/203* (2013.01); *G06F 11/0724* (2013.01); *G06F 11/0793* (2013.01); *G06F 11/1417* (2013.01); *G06F 11/2284* (2013.01); *G06F 2201/805* (2013.01)

(58) Field of Classification Search
CPC ............. G06F 11/1417; G06F 11/0724; G06F 11/0793; G06F 11/2284
See application file for complete search history.

(56) References Cited

U.S. PATENT DOCUMENTS

| 5,872,907 | A  | * | 2/1999  | Griess .................. G06F 11/141 |
|           |    |   |         | 714/17 |
| 6,550,019 | B1 | * | 4/2003  | Ahrens ............... G06F 11/0727 |
|           |    |   |         | 713/1 |
| 7,159,234 | B1 |   | 1/2007  | Murphy et al. |
| 7,526,639 | B2 |   | 4/2009  | Duron et al. |
| 7,984,183 | B2 |   | 7/2011  | Andersen et al. |
| 9,137,141 | B2 |   | 9/2015  | Gabriel et al. |
| 2003/0074598 | A1 | * | 4/2003 | Bossen ............... G06F 11/0772 |
|           |    |   |         | 714/5.11 |
| 2003/0172320 | A1 |   | 9/2003 | Mehta et al. |
| 2005/0149783 | A1 | * | 7/2005 | Britson .......... G01R 31/318572 |
|           |    |   |         | 714/724 |
| 2009/0327813 | A1 | * | 12/2009 | Coronado ........... G06F 11/1417 |
|           |    |   |         | 714/36 |
| 2010/0125747 | A1 |   | 5/2010 | Bailey et al. |
| 2010/0251029 | A1 | * | 9/2010 | Agha .................. G06F 11/2284 |
|           |    |   |         | 714/40 |

* cited by examiner

*Primary Examiner* — Charles Ehne
(74) *Attorney, Agent, or Firm* — Alexander G. Jochym (57) ABSTRACT

An approach for at least one service processor to receive a notification of at least one failure during an initial program load of a server and to identify at least one step failing the initial program load. The at least one service processor determines whether a set of conditions are met to switch the initial program load responsibility from a master processor to a service processor. Furthermore, responsive to the at least one service processor determining that the set of one or more conditions are met to switch initial program load responsibility, the at least one service processor assumes the initial program load responsibility.

19 Claims, 5 Drawing Sheets

FIG. 5

SWITCHING INITIAL PROGRAM LOAD RESPONSIBILITY WHEN COMPONENTS FAIL

BACKGROUND OF THE INVENTION

The present invention relates generally to the field of computer systems and more particularly to a method to improve a server system's ability to execute an initial program load process when an initial program load fails.

Server systems such as enterprise servers play a crucial role in an enterprise information technology (IT) infrastructure. The configuration of these servers range from a single multicore processor accessing a few gigabits of memory to hundreds of multicore processors with terabits of memory. As the size of the server system increases, the time to configure and initialize the server increases proportionally.

In a typical server system initial program load (IPL) also known as booting up or "IPLing" a system, board management controllers or service processors initially check the condition of the server components before the application of power to the main or host server. In cases where the full diagnosis mode is enabled, completing an IPL, particularly in large server systems, is time consuming as each server component sequentially checks every hardware element before giving control to the next server component for hardware verification. In order to reduce downtime when an IPL fails, many server systems and especially, most high-end servers employ redundant hardware elements. Redundant hardware elements are typically incorporated within a server system that includes IPL critical hardware elements executing the instructions to initialize processors, busses such as memory busses, and memory devices that store hostboot firmware, kernel, and files systems enabling the IPL process. Recovery methods for a failing IPL include powering down the server system and re-starting the IPL using redundant hardware for the failed hardware elements.

SUMMARY

Embodiments of the present invention disclose a method, a computer program product, and a computer system for at least one service processor to receive a notification of at least one failure during an initial program load of a server and to identify at least one step failing the initial program load. The method includes the at least one service processor determining whether a set of conditions are met to switch initial program load responsibility from a master processor to a service processor. Furthermore, the method includes responsive to the at least one service processor determining that the set of one or more conditions are met to switch the initial program load responsibility, assuming, by the at least one service processor, the initial program load responsibility.

DETAILED DESCRIPTION

In typical server systems, the configuration and initialization of a system also known as a server boot or initial program load (IPL) involves many IPL steps and sub-steps along with multiple components before the payload (e.g., hypervisor/partition firmware/operating systems) is loaded. An IPL is generally driven by a master processor in the host server that is connected to a memory device, such as a processor NOR (PNOR) flash device. The memory device or PNOR flash device stores hostboot firmware, kernel, and system files. A microprocessor in the master processor, which may be known as a self-boot engine, initializes the master processor needed for continuing an IPL.

In most cases, a small microprocessor known as a service processor or board management controller assists an IPL. In addition to playing a crucial role in performing an IPL on a server system, service processors are important in monitoring the server system health during runtime and alerting users of changes in a server status or the health of the server system.

Embodiments of the present invention recognize that in the event a failure of a major component crucial for initial program load or booting-up a server system occurs, recovery mechanisms involve powering down the server system and re-initialization of the server system using redundant hardware or components. Embodiments of the present invention recognize that halting an initial program load and re-starting the IPL using redundant components in place of failed hardware components is a conventional practice in low end, high end, and multi-node server systems. Completing an IPL process with redundant hardware is time consuming, particularly in a high-end server system involving numerous steps in a large number of hardware elements and re-starting a failed IPL results in significant downtime.

Embodiments of the present invention provide a method that improves initial program load process (the IPL process) when a major component crucial to the initial program load fails, such as a master processor; a memory device, such as PNOR flash device storing hostboot firmware; and/or a self-boot engine. Embodiments of the present invention provide a method that not only reduces the time for correcting a failed IPL but also may reduce the need for some redundant components. Embodiments of the present invention provide a method that switches responsibility of an IPL from a master processor in a main server or host to a board management processor such as a service processor to complete an IPL during some instances of a failed IPL. Embodiments of the present invention enable a service processor to assume control of a failed IPL under certain conditions and take corrective actions on identified failing components so that the IPL may continue without powering down the whole server system and re-starting a new IPL using redundant components.

Figure 1:
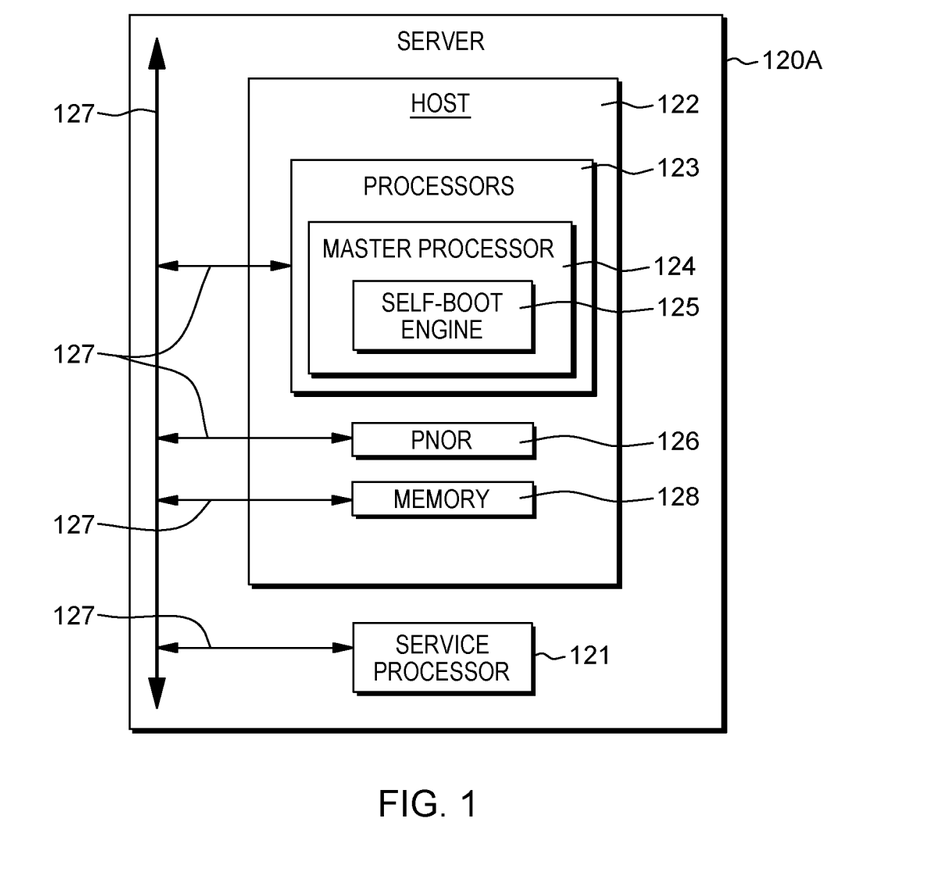
FIG. 1 is a functional block diagram illustrating a single node server computer used in a distributed data processing environment, in accordance with an embodiment of the present invention.

FIG. 1 is a functional block diagram of a single node server 120A in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted, FIG. 1 includes server 120A, service processor 121, host 122, processors 123, master processor 124, self-boot engine 125, processor NOR ("PNOR") 126, bus 127, and memory 128. While the hardware elements or components illustrated in FIG. 1 are involved in an IPL process, many other hardware components may be present in a server computer that may be involved in server 120A's IPL process but are not included in FIG. 1.

Server 120A depicted in FIG. 1 is a single node server system that server 120B can be a standalone computing device, an enterprise server, a management server, a web server, a mobile computing device, or any other electronic device or server computer system capable of receiving, sending, and processing data. In other embodiments, server 120A represent a server computing system utilizing multiple computers as a server system, such as in a cloud computing environment. In another embodiment, server 120A can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via a network such as the Internet. In another embodiment, server 120A represents a computing system utilizing clustered computers and components (e.g., server clusters, enterprise servers, database server computers, application server computers, etc.) that act as a single pool of seamless resources when accessed within distributed data processing environment 100 via a network.

Server 120A includes service processor 121, host 122 including processors 123, master processor 125, self-boot engine 125, PNOR 126, bus 127, and memory 128. In various embodiments, server 120A is a single node server computer (e.g., as depicted in FIG. 1). In various embodiments, server 120A is not limited to the hardware elements depicted in FIG. 1 but may include other components or hardware elements not depicted in FIG. 1. Server 120A may include internal and external hardware components, as depicted and described in further detail with respect to FIG. 5.

Service processor 121 is a microcontroller. Service processor 121 may also be known as a board management controller. Service processor 121 initially checks the condition or state of server hardware components or host components such as processors 123 and memory 128 to verify functionality before powering up the components and host 122. Service processor 121 may include or access firmware used in monitoring/diagnosing host 122 and/or server computer 120A health during both IPL and runtime. Firmware is software or code, typically held in non-volatile memory devices such as flash memory devices, read-only memory (ROM) devices, and the like. Firmware provides control, monitoring, and data manipulation in devices such as computers, computer peripherals, embedded systems and the like. In various embodiments, service processor 121 may access information and firmware used for IPL stored in PNOR 126 and self-boot engine 125. In an embodiment, service processor 121 accesses functional firmware necessary for the IPL, from persistent storage (not shown) included within service processor 121, in response to a determination that the IPL responsibility is switched or transferred from master processor 124 to service processor 121.

Host 122 is the hardware of server 120A that includes key electronic components such as processors, memory, and supporting semiconductor devices. Host 122 may also be known as a central electronic complex or CEC. Host 122 includes processors 123, PNOR 126, bus 127, and memory 128 connected together as a functional CEC using one or more busses (e.g., bus 127).

Processors 123 in host 122 include a master processor 124 and a corresponding self-boot engine 125. Server computer 120 may have one or more instances of processors 123 used for various processing functions in server 120A. Processors 123 include a least one instance of master processor 124 connected to PNOR 126 via bus 127.

Master processor 124 is a processor of processors 123 that includes self-boot engine 125. Master processor 124 executes the instructions that initialize other processors and the other busses included in bus 127 including the memory bus connecting processors 123 and other host components during a hostboot or initialization of host 122. Master processor 124 connects to PNOR 126, a memory device that stores many of the functions and instructions used by master processor 124 during an IPL. In various embodiments, two or more instances of master processor 124 are included within host 122; however, during an IPL, only one instance of master processor 124 connected to PNOR 126 is utilized.

Self-boot engine 125 is a microprocessor included in master processor 124. Self-boot engine 125 in master processor 124 upon powering up or applying power to host 122 initializes the master core image in master processor 124, for example, using the master core image loaded in a serial electronically erasable programmable read-only memory (SEEPROM) device or other similar memory device capable of storing a master core image for IPL. Initializing master processor 124 involves numerous steps for each function. For example, one step of an initialization is setting reference clocks. After initializing master processor 124, self-boot engine 125 loads hostboot firmware retrieved from PNOR 126. Self-boot engine 125, using hostboot firmware from PNOR 126, starts the initialization of memory 128 (i.e., main memory) and the other components (not shown) that are needed for loading extended image or master core image into memory 127.

PNOR 126 is a processor NOR flash memory device (e.g., a flash random access memory (RAM) using Boolean NOR logic or joint denial) that includes some limited processing capability. PNOR 126 includes hostboot firmware. In various embodiments, PNOR 126 stores the hostboot firmware, kernel, and system files utilized by master processor 124 during a conventional IPL process and by service processor 121. PNOR 126 is accessible to service processor 121 via bus 127. In various embodiments of the present invention, service processor 121 accesses hostboot firmware, kernel, and system files within PNOR 126 in response to a determination that the IPL responsibility is switched or transferred from master processor 124 to service processor 121 during an IPL fail. In an embodiment, the instructions, code, functionality and firmware in PNOR 126 are stored in another type of memory device (e.g., an erasable programmable read only memory (EPROM), a ROM device, etc.) accessible to service processor 121 and master processor 124.

Bus 127 includes one or more busses such as a memory bus connecting processors 123 to main memory or memory 128. Bus 127 composes communication fabric 502 depicted in FIG. 5. Bus 127 provides a communication path between various devices or hardware elements in server 120A and 120B. Bus 127 may include, but is not limited but is not limited to; one or more of a memory bus, system bus, peripheral component interconnect (PCI) bus, I/O bus, and the like.

Memory 128 is the main memory for host 122. Memory 128 stores information that may be used in loading the extended firmware image. In an embodiment, memory 128 initializes during an IPL after self-boot engine 125 loads hostboot firmware retrieved from PNOR 126.

Figure 2:
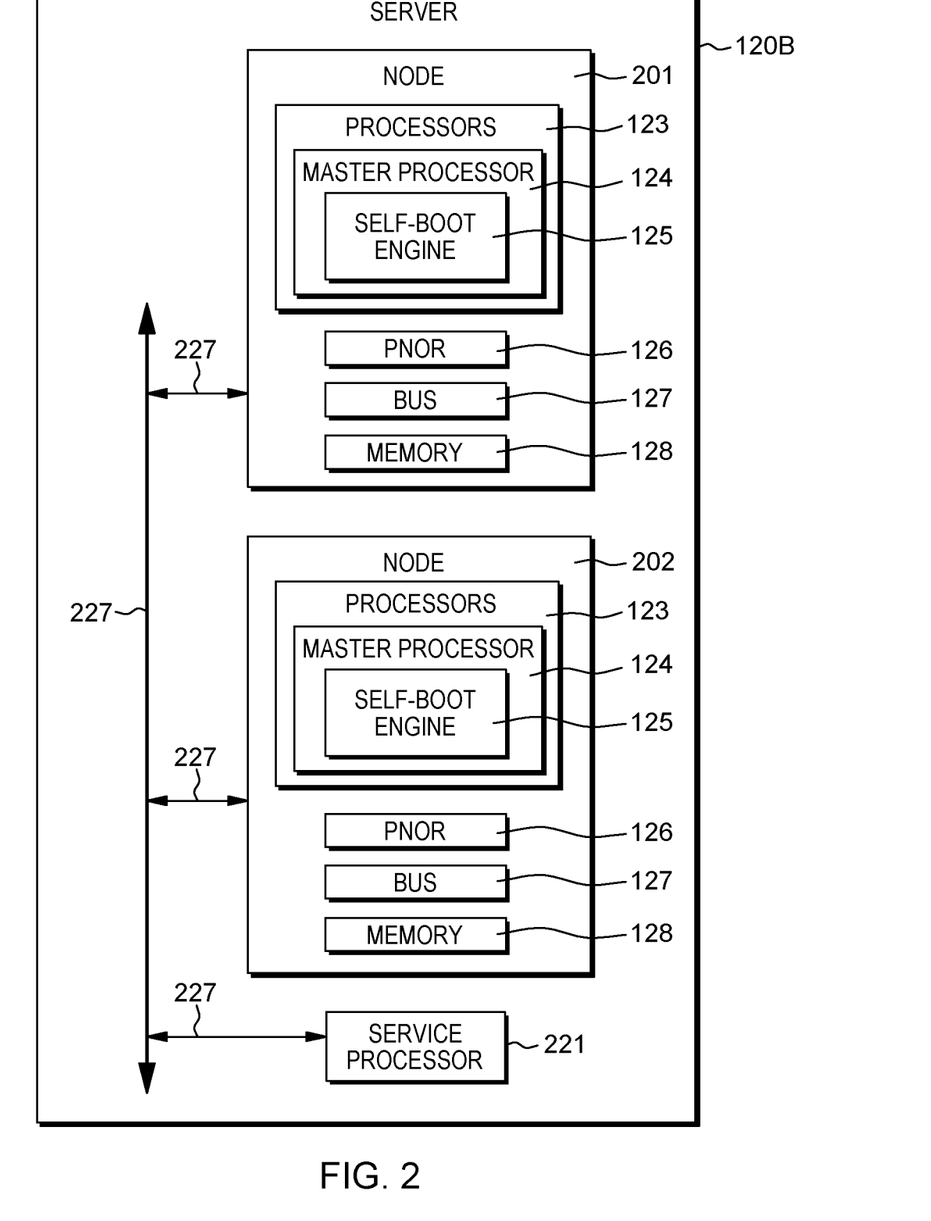
FIG. 2 is a functional block diagram illustrating a multi-node server computer in a distributed data processing environment, in accordance with an embodiment of the present invention.

FIG. 2 is a functional block diagram illustrating a multi-node server 120B, in accordance with an embodiment of the present invention. As depicted, FIG. 2 includes server 120B, which is a multi-node server system, includes node 201, node 202 and service processor 221 connected by bus 227. In an embodiment, server 120B is a multi-node server system operating in a distributed processing environment.

Server 120B is a multi-node server including node 201 and node 202. Multi-node server 120B is a multi-node server system that includes at least two nodes as depicted in FIG. 2. In an embodiment, node 201 and node 202 reside in different physical locations (e.g., in a system, in a room, or in different buildings). In this embodiment, the connections between node 201 and node 202 depicted as bus 227 may be made over the Internet, through cables (optical or wires), wireless connections or other known connection method for nodes of a multi-node server, such as a virtual local area network (VLAN). In various embodiments, node 201 and node 202 reside in the same physical location.

Node 201 is a node in multi-node server 120B. As known to one skilled in the art, a node is a single self-contained entity server 120A that includes processors 123, master processor 124, self-boot engine 125, PNOR 126, memory 128, and other supporting devices with the ability to IPL in parallel with node 202. A node such as node 201 is capable of perform an IPL or booting up independently of other nodes (e.g., node 202) in multi-node server 120B prior to connecting to the other nodes of the multi-node server 120B, for example, as a part of a symmetric multi-processing step in multi-node server 120B IPL process. Node 202 is another node in multi-node server 120B. In various embodiments, node 201 and node 202 are not limited to the hardware elements depicted in FIG. 2. As known to one skilled in the art, node 201 and 202 may have more or different hardware elements than depicted in FIG. 2.

Service processor 221, like service processor 121, is a microcontroller or a board management controller connected to node 201 and node 202 by bus 227. Service processor 221 provides the same support, functionality, and capabilities of service processor 121 and additionally, supports multi-node server 120B in an IPL of the multi-node system composed of node 201 and node 202.

Figure 3:
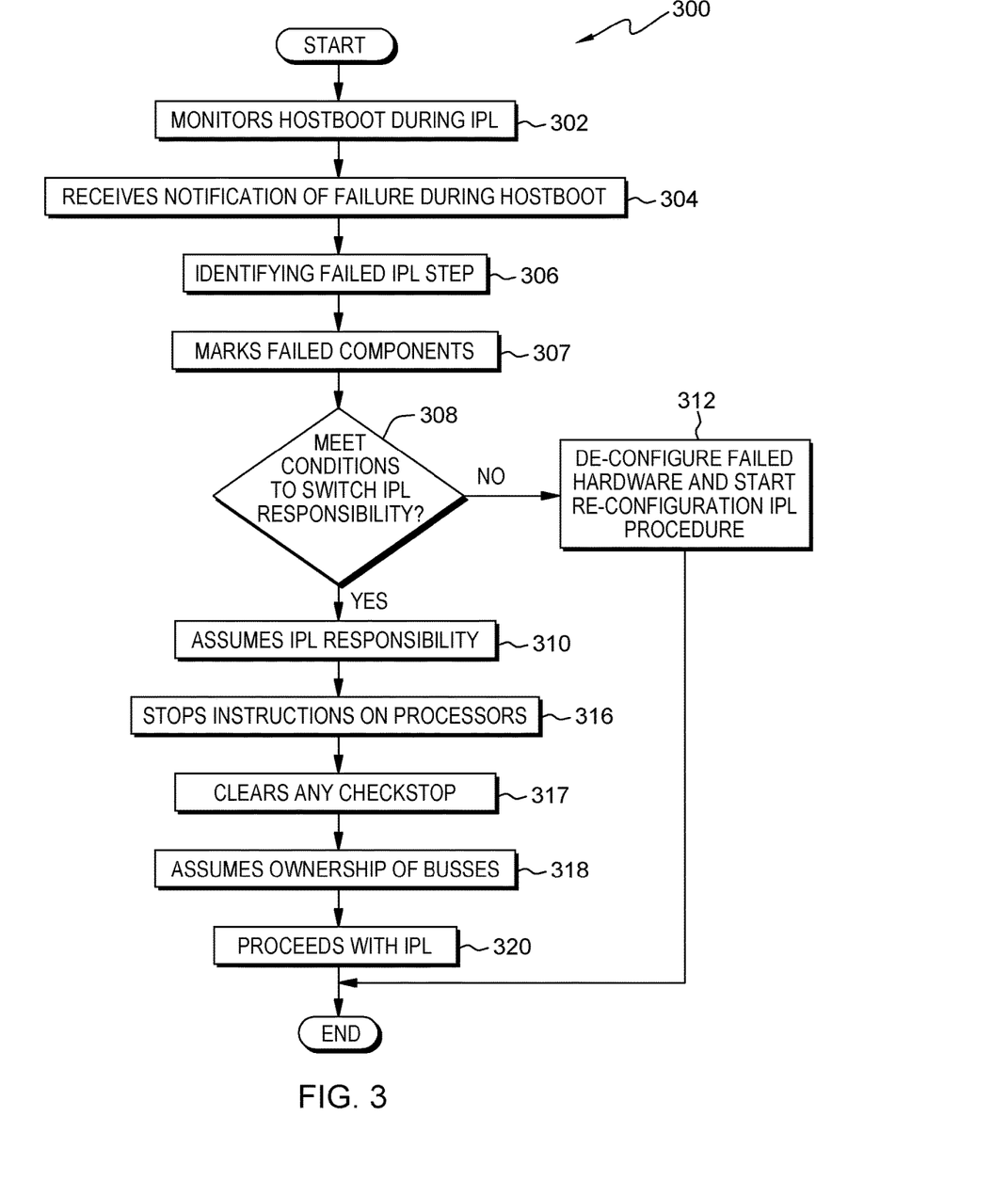
FIG. 3 is a flowchart depicting operational steps of one example of a method to switch responsibility for initial program load for a node of a server computer, in accordance with an embodiment of the present invention.

FIG. 3 is a flowchart 300 depicting operational steps of one example of a method to switch responsibility for initial program load for server 120A, in accordance with an embodiment of the present invention. As depicted, FIG. 3 includes one example of a method to switch the responsibility of a failed IPL to a service processor (e.g., service processor 121) for performing an IPL of a host server or a hostboot of server 120A. Server 120A is depicted a single node server in FIG. 1. Switching IPL responsibility from master processor 124 to service processor 121 allows an IPL, in some instances, to continue upon a hostboot fail, reducing a time to IPL as compared to a conventional IPL process that powers down server 120A and starts a re-configure IPL using redundant components or hardware.

In step 302, service processor 121 monitors hostboot during IPL. The process of initializing host hardware (e.g., hostboot) during an IPL may be broken into multiple steps. Each step in a hostboot process (e.g., a sequence), during IPL, may be further divided into sub-steps. The time required to initialize or IPL a system increases (e.g., requires more steps and/or sub-steps) or scales with increasing server computer size. Conventionally, service processor 121 tracks the various steps and sub-steps in the IPL process using components and functions such as attention handlers and processor runtime diagnostics.

In step 304, service processor 121 receives a notification of a failure during hostboot. If the hostboot image is corrupted or if one or more components fail such as a master processor 124 or a failed connection to PNOR 126 in a hostboot during IPL, then service processor 121 that is closely monitoring the hostboot progress receives a notification of the fail or fails. In an embodiment, service processor 121 receives a notification of more than one failures identified during an IPL or hostboot. The notification may be received from one or more of; a terminate immediate function, an attention handler, a heartbeat, or other similar known software elements or components.

In step 306, service processor 121 identifies the failed IPL step occurring during a hostboot of the IPL. Upon notification of a failure during the hostboot of an IPL, service processor 121 checks the source of the failure or failures; for example, by probing hardware registries using fault isolation register (FIR) bits. In an embodiment, service processor 121 identifies more than one failed IPL step. Utilizing components running on service processor 121, such as attention handlers and processor runtime diagnostics, service processor 121 may identify the failure and any other errors along with the step or sub-step of the IPL hostboot process (sequence) in which the failure or errors occur.

In step 307, service processor 121 marks failed components. Service processor 121 marks failed components so that the next IPL is aware of failed components and may use redundant components or redundant hardware components in place of the one or more failed components. Service processor 121 marks failed components and de-configures the failing components or takes other corrective actions such as correcting a recoverable hardware or correcting software errors for the failed components using known methods. Service processor 121 de-configures failing components so that notification of the failing components is provided to the host for the next IPL so that the IPL process may be adjusted accordingly (e.g., bypassing failing components or using redundant hardware).

In decision step 308, service processor 121 determines whether conditions are met to switch IPL responsibility. Service processor 121 determines whether switching IPL responsibility from master processor 124 to itself (e.g., to service processor 121) for a hostboot is appropriate based on several criteria and/or conditions. Certain conditions or a set of conditions, such as the type of failure detected and the timing or IPL step in which the failure is detected prohibit or reduce the effectiveness of switching IPL responsibility to service processor 121 during an IPL or a hostboot (e.g., of host 122).

Service processor 121 determines if a set of conditions are met to support a switch of IPL responsibility from master processor 124 to service processor 121 for a boot-up of the host (e.g., host 122). The conditions, described in more detail below, for switching responsibility of an IPL from master processor 124 to service processor 121 include, for example, when bus 127 is functioning (e.g., a bus issue is not detected), when communication is occurring correctly in service processor 121, and when an IPL fails in a middle or late step in the IPL. In order for service processor 121 to assume IPL responsibility, service processor 121 determines that the various busses of bus 127 are correctly functioning and transmitting data as required as a condition for switching IPL responsibility. Service processor 121 can identify issues in bus 127 however, service processor 121 does not have the ability to provide bus repair to bus 127. Therefore, as a condition for service processor 121 assuming IPL responsibility, service processor 121 verifies that bus 127 functions properly and/or without communication issues.

Similarly, in order for service processor 121 to assume IPL responsibility, communication to and from service processor 121 needs to be occurring normally. As another condition for switching IPL responsibility from master processor 124 to service processor 121, service processor 121 determines that no communication issues are present within service processor 121 itself.

Another condition for switching IPL responsibility to service processor 121 is the determination by service processor 121 that the failing IPL step occurs in a middle or late step in the IPL. Switching IPL responsibility when an IPL fails in one of the early IPL steps provides little to no benefit in terms of IPL time gained by switching IPL responsibility to service processor 121 (e.g., continuing with IPL). Since using a service processor (e.g., service processor 121) in an IPL is slower than an IPL directed by a host processor such as master processor 124, switching IPL responsibility to service processor 121 during an IPL that fails early in the IPL process may not decrease the time to IPL. Since service processor 121 is slower than a host processor (e.g., master processor 124) when directing an IPL, switching responsibility of the IPL to service processor 121 provides an advantage in time savings in middle to late steps of the IPL. For example, when service processor 121 determines an IPL fails in a step in the last seventy-five or last ninety percent of the IPL steps switching IPL responsibility from master processor 124 to service processor 121 may provide advantages in IPL time or reduce the time server 120A is unavailable due IPL fails. If in a specific example, service processor 121 identifies an IPL fail in step forty-five of a fifty step IPL process, then service processor 121 assumes responsibility for the IPL (assuming that the other previously discussed conditions are in effect).

In response to service processor 121 determining that the conditions for switching IPL responsibility are met (yes branch decision 308), then service processor 121 assumes IPL responsibility (step 310). For example, when service processor 121 determines that an IPL fail occurs in a middle step of the IPL (e.g., in a 25'th step in a 60 step IPL) and the other conditions for switching IPL responsibility (e.g., bus 127 properly functions and service processor 121 is properly functioning and receiving communications), then service processor 121 assumes and maintains IPL responsibility to complete a failing IPL in server 120A.

In various embodiments, in step 310 if service processor 121 determines that any of the fails occur in the middle of a sub-step of the IPL, then service processor 121 reverts the IPL of server 120A to the previous successful IPL step, and proceeds with the remaining IPL process steps. As depicted in Table 1 below, IPL step 8 with sub steps 1 through 8 fails during Fabric I/O run training (i.e., during sub step 4). In this example, when a fail occurs in sub-step 4 in an IPL step such as IPL step 8, service processor 121 upon identifying failing sub-step 4 reverts back to the beginning of IPL step 8, which is the beginning of an IPL step where IPL was functioning.

TABLE 1

| IPL STEP 8 | ACTION |
|---|---|
| Sub step 1 | Fabric repair |
| Sub step 2 | Fabric I/O calculate |
| Sub step 3 | Fabric pre-train |
| Sub step 4 | Fabric I/O run training (FAILS) |
| Sub step 5 | Fabric post train |
| Sub step 6 | Host start |
| Sub step 7 | Start processor bus |
| Sub step 8 | Host listen processor |

In step 316, service processor 121 stops instructions on processors. Service processor 121 temporarily stops or halts instructions from executing on processors 123 before continuing with IPL. In step 317, service processor 121 clears any checkstop. If a failure is attributed to a checkstop, which is a fatal error resulting in a server crash, then service processor 121 clears the checkstop. Service processor 121 corrects any identified checkstops or fatal errors using known methods so that the IPL process may proceed without a server crash.

In step 318, service processor 121 assumes ownership of busses. In various embodiments, service processor 121 assumes control of the various busses (e.g., bus 127 that may be a system bus, I/O bus, etc.) in the communication fabric of server 120A. After assuming control of busses, service processor 121 updates track records and logs before continuing the IPL.

In step 320, service processor 121 proceeds with IPL. After assuming control of IPL by taking the outlined steps above (e.g., stopping the execution of instructions and addressing the above actions regarding failing components), service processor 121 continues with IPL until the hostboot is complete and the IPL sequence is complete (e.g., server 120A is up).

However, when service processor 121 determines that one or more conditions of the conditions outlined above are not met (no branch decision step 308), then service processor 121 de-configures the failed components and a standard re-configuration IPL proceeds (step 312) using known methods. For example, when service processor 121 identifies one of the following conditions discussed below, switching of IPL responsibility from a host processor (e.g., master processor 124) to service processor 121 does not occur and standard or known marking and/or de-configuring of failed components occurs.

An example of a condition negating the advantage of switching IPL responsibility from master processor 124 in host 122 to service processor 121 occurs when service processor 121 determines that the IPL fail occurs due to a failure occurring in one or more busses of bus 127. In the case of an identified bus 127 issue or failure then, service processor 121 does not assume IPL responsibility. In this instance, service processor 121 does not assume IPL responsibility due to the fact that service processor 121 cannot provide communication bus repair.

Another example of a condition occurring which negates the advantage of switching IPL responsibility from host master processor 124 to service processor 121 includes the following condition. If service processor 121 determines a communication issue is occurring within service processor 121 itself, then service processor 121 does not assume IPL responsibility. A communication issue to service processor 121 causes incomplete information or no information to be transmitted to service processor 121; and therefore, switching responsibility for the IPL to service processor 121 is not effective during an IPL under this condition.

Another condition of the one or more conditions when service processor 121 does not assume IPL responsibility is an IPL fail occurs in an early step of the IPL process. For example, if an IPL failure is identified during an early step in the IPL such as in a step occurring in the first several steps or occurs within the first 10-25% of the steps in an IPL process (e.g., sequence), then switching of IPL responsibility to service processor 121 is not warranted. For example, in an IPL using 21 steps with numerous sub-steps, if the IPL fail occurs in one of the first 5 steps that are critical and occur very quickly, then switching the IPL responsibility to service processor 121 that is slower is not warranted. However, an IPL that fails in the middle or later steps of an IPL may be completed faster under the direction of service processor 121 when IPL responsibility is switched or assumed by service processor 121.

Figure 4:
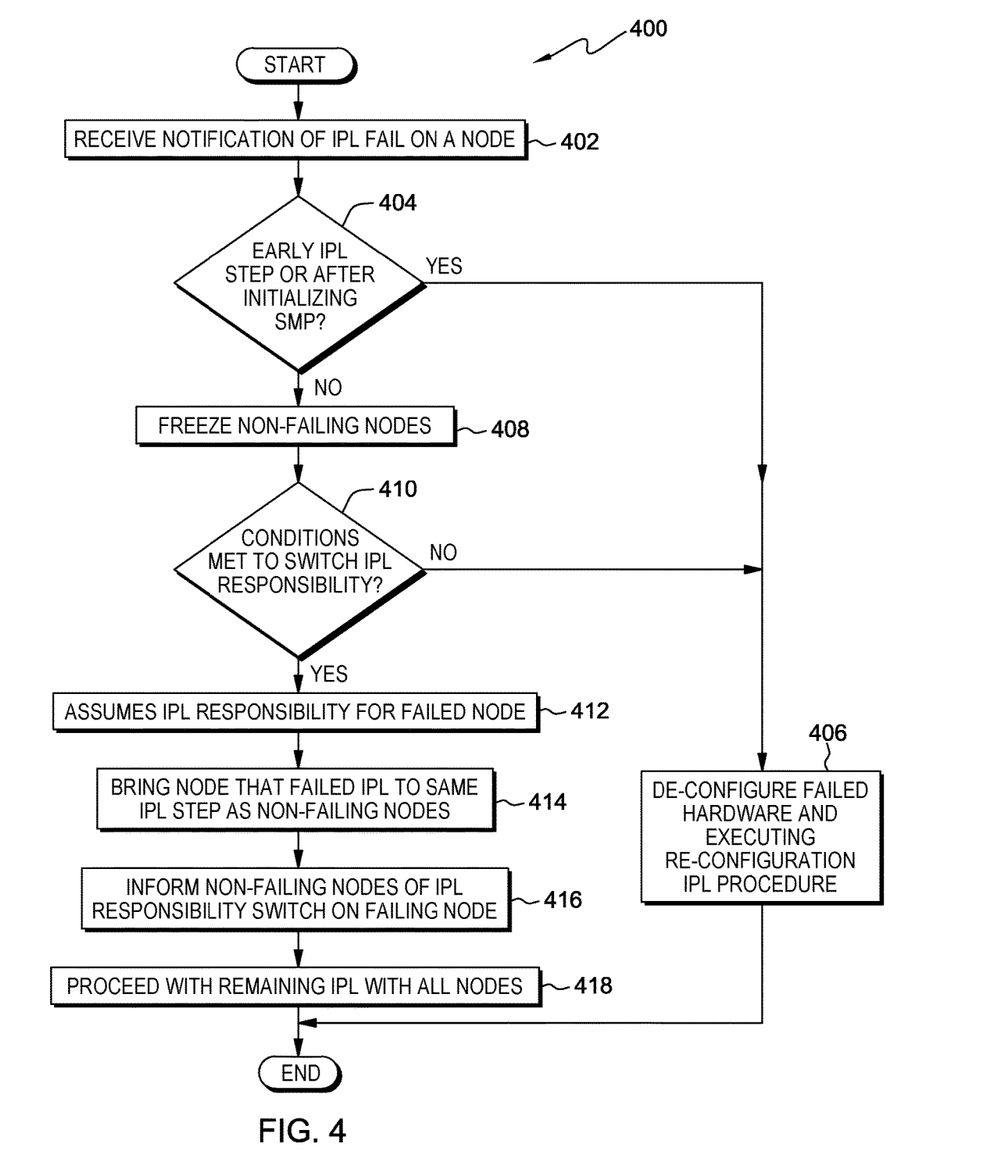
FIG. 4 is a flowchart depicting operational steps of one example of a method to switch responsibility for initial program load in a multi-node server computer, in accordance with an embodiment of the present invention.

FIG. 4 is a flowchart 400 depicting operational steps of one example of a method to switch responsibility for initial program load in multi-node server 120B, in accordance with an embodiment of the present invention. As depicted, FIG. 4 includes the operational steps of an IPL process on multi-node server 120B depicted in FIG. 2 in response to a fail identified in a node of server 120B during IPL. In an IPL within a multi-node server system (e.g., server 120B) experiencing an IPL fail within a node of the multi-node server computer, the traditional solution includes halting the IPL, powering down the server system, and undergoing a complete system re-configuration IPL (i.e., a re-configuration for all nodes). In the IPL method 400 outlined in the operational steps in FIG. 4, service processor 221 provides a way to more efficiently complete an IPL in a multi-node server system by halting or stopping the IPL on non-failing nodes and switching the IPL responsibility for the IPL to service processor 221. Subsequently, service processor 221 takes corrective actions on the failing node or nodes. Service processor 221 may take or execute known corrective actions such as clearing checkstops and other fatal errors along with other similar corrective actions to repair or bring failing node to a functionality level similar or the same level or IPL step/sub-step as the non-failing nodes.

In step 402, service processor 221 receives a notification of an IPL fail on a node. Service processor 221 receives notification that a node or one or more nodes are failing during IPL, and in response, service processor 221 determines in decision step 404, whether the failure occurred at an early IPL step or after initializing symmetric multi-processing (SMP). If service processor 221 determines that the node is failing in one of the early IPL steps (e.g., in a step within the initial 10-25% of the IPL steps) or has failed after initializing symmetric multi-processing in multi-node server 120B (yes branch of decision step 404), then service processor 221 de-configures failed hardware and executes a re-configuration IPL using known methods in step 406.

However, if service processor 221 determines the node or nodes did not fail in an early IPL step or after initializing SMP (no branch decision 404), then service processor 221 assumes IPL responsibility and freezes all non-failing nodes (step 408). Service processor 221 halts or stops on a temporary basis IPL progress on non-failing nodes.

In decision step 410, service processor 221 determines whether the conditions are met to switch IPL responsibility for the failing node. At decision step 410, service processor 221 determines whether IPL corrective actions for the failed node will continue. After identifying the failed IPL step or steps for the failing node as previously discussed with respect to step 306, and using the conditions discussed in step 308 of FIG. 3, service processor 221 evaluates if the conditions are met to switch IPL responsibility (e.g., from a master processor in the node to service processor 221). If one or more of the conditions previously outlined in step 308 of FIG. 3 are not met (no branch decision step 410), then service processor 221 de-configures failed hardware and executes re-configuration IPL procedure for server 120B using known methods (step 406).

However, if in decision step 410, service processor 221, using identified step(s) of the failed IPL as previously discussed with respect to FIG. 3 in step 306 and the conditions discussed in step 308, determines that the conditions are met to switch IPL responsibility (yes branch decision step 410) then, service processor 221 assumes IPL responsibility for the failed node (step 412). When service processor 221 determines that the conditions (e.g., the fail occurring in a middle or late IPL step) in the failing node or nodes as discussed in step 308 are met the IPL on the failing node is managed by service processor 221.

After assuming responsibility for IPL'ing the failing node or nodes, in step 414, service processor 211 brings the failing node or nodes to the same IPL level as the non-failing nodes. Using the corrective actions and methods as discussed in detail in steps 307 and 316-318 of FIG. 3, service processor 221 brings the IPL process on the one or more failing nodes to the level of the non-failing IPL nodes. Service processor 221 marks and/or guards failed components as discussed previously with respect to step 307, halts instructions on the processors in the failing node, and clears any checkstops on the failing node according to the actions previously discussed with respect to steps 316, 317, and 318 of FIG. 3. Additionally, service processor 221 assumes ownership of busses as discussed in step 318. Once the failed node reaches the IPL step (e.g., to the same IPL step and/or IPL sub-step) and progress level of the non-failed nodes in multi-node server 120B, service processor 221 integrates or links the non-failing nodes and the failing node or nodes together. Service processor 221 unfreezes wakes up non-failing nodes to release the non-failing nodes from sleep mode.

In response to service processor 221 bringing the node that failed IPL to the same IPL step or sub-step as the non-failing nodes, integrating nodes, and waking up the non-failed nodes, then in step 416, service processor 221 informs the non-failing nodes of the IPL responsibility switch from the host processor (e.g., master processor 124) to service processor 221 in the failed node. The non-failing nodes are notified by service processor 221 that the service processor is assuming IPL responsibility for the failed node.

Service processor 221 proceeds with the remaining IPL (step 418) on the nodes of multi-node server 120B. Service processor 221 continues the IPL to completion with the failing and non-failing nodes linked together and service processor 221 continuing control/direction of the IPL in the previously failed node.

In various embodiments, by using service processor 221 when an IPL fail occurs, a complete system re-configuration IPL of the nodes in a multi-node system (e.g., server 120B) may be avoided under certain conditions. Thus, switching responsibility for an IPL of a multi-node server system to a service processor such as service processor 221 may provide a more effective way to IPL multi-node server 120B without stopping the nodes of the multi-node server computer and re-starting the timing consuming process of an IPL on the each of the various nodes of a multi-node server such as server 120B.

Figure 5:
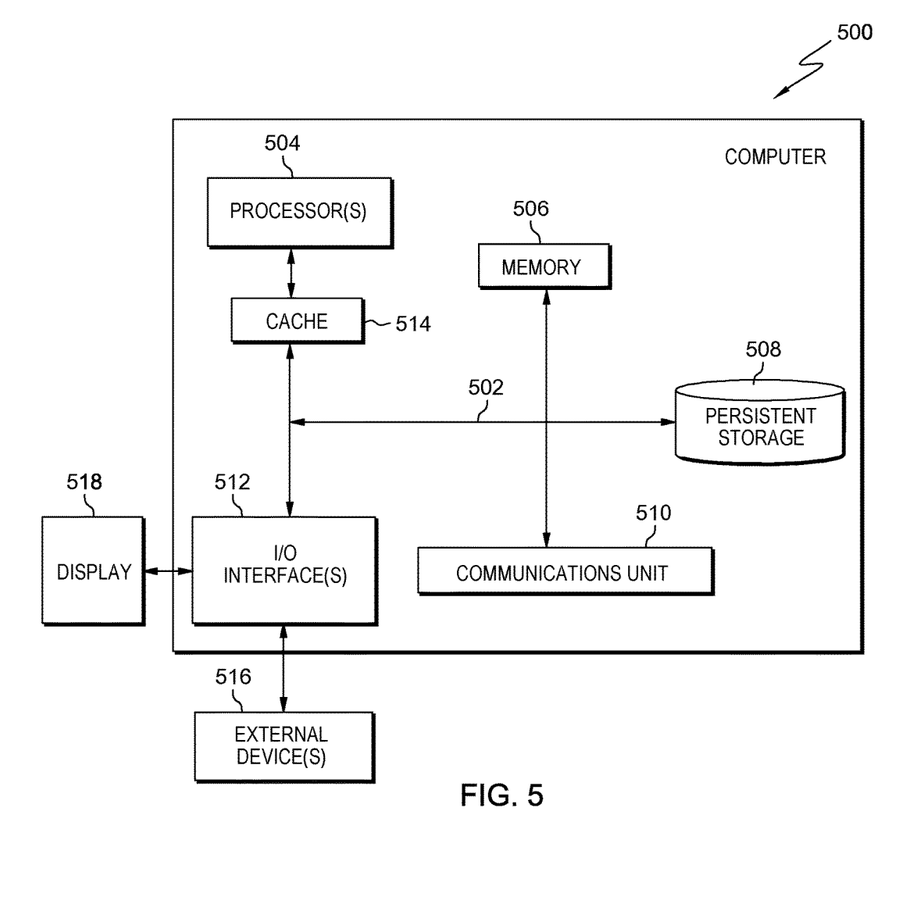
FIG. 5 is a block diagram depicting components of a computer system, such as the server computer of FIG. 1 or FIG. 2, in accordance with at least one embodiment of the present invention.

FIG. 5 is a block diagram 500 depicting components of a computer system in accordance with at least one embodiment of the present invention. As depicted, FIG. 5 depicts the components of a computer system, which is an example of a system such as server 120A and server 120B, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Servers 120A and 120B can include processor(s) 504, cache 514, memory 506, persistent storage 508, communications unit 510, input/output (I/O) interface(s) 512, and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention are stored in persistent storage 508 for execution and/or access by one or more of the respective processor(s) 505 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is part of persistent storage 508.

Communications unit 510, in these examples, provides for communications with other data processing systems or devices, including resources of server 120A and 120B and other computing devices not shown in FIGS. 1 and 2. In these examples, communications unit 510 includes one or more network interface cards. Communications unit 510 may provide communications with either or both physical and wireless communications links. Program instructions and data used to practice embodiments of the present invention may be downloaded to persistent storage 508 through communications unit 510.

I/O interface(s) 512 allows for input and output of data with other devices that may be connected to server computers 120A and 120B. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method comprising:

receiving, by at least one service processor, a notification of at least one failure during an initial program load of a server;

identifying, by the at least one service processor, at least one step failing the initial program load;

determining, by the at least one service processor, whether a set of conditions are met to switch the initial program load responsibility from a master processor to a service processor, wherein the set of conditions includes: determining the at least one step failing the initial program load is not an early step in the initial program load, determining the at least one step failing the initial program load is not failing due to a communication issue to a service processor, and determining the at least one step failing the initial program load is not failing due to a bus issue; and responsive to determining that the set of one or more conditions are met to switch the initial program load responsibility, assuming, by the at least one service processor, the initial program load responsibility.

2. The method of claim 1, further comprising:

executing, by the at least one service processor, one or more corrective actions for one or more failed hardware components in the initial process load with the at least one failure on a node in the server; and proceeding, by the at least one service processor, with the initial program load of the server.

3. The method of claim 2, wherein executing one or more corrective actions for the one or more failed hardware components further comprises:

marking, by the at least one service processor, the one or more failed hardware components;

stopping, by the at least one service processor, on a temporary basis, initial program load on one or more other processors;

clearing, by the at least one service processor, any fatal errors; and assuming, by the at least one service processor, ownership of one or more busses.

4. The method of claim 1, wherein assuming responsibility for the initial program load from the master processor further comprises accessing one of a processor NOR flash memory device or processor device persistent storage for information needed for initial program load.

5. The method of claim 1, wherein information accessed for the initial program load includes at least hostboot firmware, a kernel, and a system file.

6. The method of claim 1, wherein receiving the notification of the at least one failure during an initial program load of a server occurs for at least one node of a multi-node server.

7. The method of claim 1, further comprising:
determining, by the at least one service processor, a fail in the at least one node failing initial program load does not occur in one of an early initial program load step or after initializing symmetric multi-processing in the multi-node server;
assuming, by the at least one service processor, responsibility for the at least one node failing initial program load by the service processor in the multi-node server;
halting, by the at least one service processor, initial program load on one or more non-failing nodes in the multi-node server;
bringing, by the at least one service processor, the at least one node failing initial program load to a same initial program load step as each of the one or more non-failing nodes in the multi-node server; and
proceeding, by the at least one service processor, with one or more remaining initial program load steps with each node of the multi-node server.

8. The method of claim 1, wherein receiving a notification of at least one failure during the initial program load of a server comprises:
receiving, by the at least one service processor, a notification of a fail of at least one node in a multi-node server during the initial program load;
determining, by the at least one service processor, that the failure does not occur in one of an early initial program load step or after initializing symmetric multi-processing; and
halting, by the at least one service processor, the initial program load on each non-failing node and assume responsibility for each node of the at least one node with the failure during initial program load.

9. The method of claim 8, further comprising:
determining, by the at least one service processor, that each node of the at least one node with the failure during initial program load is to a same initial program load step as the non-failing nodes;
re-initiating, by the at least one service processor, initial program load on the non-failing nodes and continuing the initial program load to completion for each node of the at least one node with the failure during initial program load.

10. A computer program product comprising:
one or more computer readable storage media and program instructions stored on the one or more computer readable storage media, the program instructions executable by a processor, the program instructions comprising instructions for:
receiving a notification of at least one failure during an initial program load of a server;
identifying at least one step failing the initial program load;

determining whether a set of conditions are met to switch the initial program load responsibility from a master processor to a service processor, wherein the set of conditions includes: determining the at least one step failing the initial program load is not an early step in the initial program load, determining the at least one step failing the initial program load is not failing due to a communication issue to a service processor, and determining the at least one step failing the initial program load is not failing due to a bus issue; and
responsive to determining that the set of one or more conditions are met to switch the initial program load responsibility, assuming the initial program load responsibility.

11. The computer program product of claim 10, further comprising:
executing one or more corrective actions for one or more failed hardware components in the initial process load with the at least one failure on a node in the server; and
proceeding with the initial program load of the server.

12. The computer program product of claim 11, wherein executing one or more corrective actions for one or more failed hardware components further comprises:
marking the one or more failed hardware components;
stopping on a temporary basis, the initial program load on one or more other processors;
clearing any fatal errors; and
assuming ownership of one or more busses.

13. The computer program product of claim 10, wherein assuming the initial program load responsibility from the master processor further comprises accessing one of a processor NOR flash memory device or processor device persistent storage for information needed for initial program load.

14. The computer program product of claim 10, wherein receiving the notification of the at least one failure during the initial program load of the server further comprises;
receiving notification of the at least one failure of at least one node during the initial program load of a multi-node server;
determining the at least one failure in the at least one node failing initial program load does not occur in one of an early initial program load step or after initializing symmetric multi-processing; and
halting the initial program load on one or more non-failing nodes.

15. The computer program product of claim 14, further comprising:
determining whether the set of conditions are met to switch the initial program load responsibility from a master processor to a service processor in the at least one nodes failing initial program load;
responsive to determining that the set of one or more conditions are met to switch the initial program load responsibility, assuming the initial program load responsibility by the service processor;
bringing the at least one node failing initial program load to a same initial program load step as each of the one or more non-failing nodes;
re-starting the initial program load on the one or more non-failing nodes;
integrating the one or more non-failing nodes and the at least one or more node failing the initial program load; and
proceeding with one or more remaining initial program load steps with each node of the multi-node server.

16. A computer system comprising:

one or more computer processors;

one or more computer readable storage media; and program instructions stored on the one or more computer readable storage media for execution by at least one of the one or more processors, the program instructions comprising instructions for:

receiving a notification of at least one failure during an initial program load of a server;

identifying at least one step failing the initial program load;

determining whether a set of conditions are met to switch the initial program load responsibility from a master processor to a service processor, wherein the set of conditions includes: determining the at least one step failing the initial program load is not an early step in the initial program load, determining the at least one step failing the initial program load is not failing due to a communication issue to a service processor, and determining the at least one step failing the initial program load is not failing due to a bus issue; and responsive to determining that the set of one or more conditions are met to switch the initial program load responsibility, assuming the initial program load responsibility.

17. The computer system of claim 16, further comprising:

executing one or more corrective actions for one or more failed hardware components in the initial process load with the at least one failure on a node in the server;

marking the one or more failed hardware components;

stopping on a temporary basis, the initial program load on one or more other processors;

clearing any fatal errors;

assuming ownership of one or more busses, and proceeding with the initial program load of the server.

18. The computer system of claim 16, wherein receiving the notification of the at least one failure during the initial program load of the server further comprises;

receiving notification of the at least one failure of at least one node during the initial program load of a multi-node server; and determining the at least one failure of the at least one node failing initial program load does not occur in one of an early initial program load step or after initializing symmetric multi-processing; and halting the initial program load on one or more non-failing nodes.

19. The computer system of claim 18, further comprising:

determining whether the set of conditions are met to switch initial program load responsibility from a master processor to a service processor in the one or more failing nodes;

responsive to determining that the set of one or more conditions are met to switch initial program load responsibility, assuming responsibility for the initial program load by the service processor;

bringing the at least one node failing initial program load to a same initial program load step as each of the one or more non-failing nodes;

re-starting the initial program load on the one or more non-failing nodes;

integrating the one or more non-failing nodes and the at least one failing node; and proceeding with one or more remaining initial program load steps with each node of the multi-node server.

* * * * *